United States Patent
Lee

(10) Patent No.: US 8,407,565 B2
(45) Date of Patent: Mar. 26, 2013

(54) SYSTEM AND METHOD FOR PRODUCING IMPORTANCE RATE-BASED RICH MEDIA, AND SERVER APPLIED TO THE SAME

(75) Inventor: Joong Yun Lee, Seoul (KR)

(73) Assignee: SK Planet Co., Ltd., Seoul (KR)

( * ) Notice: Subject to any disclaimer, the term of this patent is extended or adjusted under 35 U.S.C. 154(b) by 595 days.

(21) Appl. No.: 12/678,367

(22) PCT Filed: Aug. 18, 2008

(86) PCT No.: PCT/KR2008/004787
§ 371 (c)(1),
(2), (4) Date: Mar. 16, 2010

(87) PCT Pub. No.: WO2009/064067
PCT Pub. Date: May 22, 2009

(65) Prior Publication Data
US 2010/0199151 A1    Aug. 5, 2010

(30) Foreign Application Priority Data

Nov. 15, 2007 (KR) .......... 10-2007-0116828
Nov. 19, 2007 (KR) .......... 10-2007-0118142

(51) Int. Cl.
*H03M 13/35* (2006.01)

(52) U.S. Cl. ...................... 714/774

(58) Field of Classification Search .......... 714/774
See application file for complete search history.

(56) References Cited

U.S. PATENT DOCUMENTS 6,707,822 B1 * 3/2004 Fadavi-Ardekani et al. .......... 370/395.5
6,775,320 B1 * 8/2004 Tzannes et al. ............. 375/222

(Continued)

FOREIGN PATENT DOCUMENTS

JP   2004-272563   9/2004
JP   2006-505193   2/2006

(Continued)

OTHER PUBLICATIONS

The Office Action for Japanese Patent Application No. 2010-533955 mailed Aug. 21, 2012.

(Continued)

*Primary Examiner* — Stephen M Baker
(74) *Attorney, Agent, or Firm* — Lowe Hauptman Ham & Berner, LLP

(57) ABSTRACT

Disclosed are a rich media sever, a rich media transmission system, and a rich media transmission method, which are adaptive to network environments. The rich media server includes an interfacing unit for communicating with a terminal, which requests rich media; a media processing unit for processing at least one piece of media corresponding to the request; a rich-media encoding unit for encoding at least one piece of media, which is output from the media processing unit, to produce rich media, and outputting the rich media to the interfacing unit in order to provide the rich media to the terminal; and a controller for determining importance rates of pieces of media constituting the rich media, based on reproduction information of the rich media, and controlling at least one of the media processing unit and the rich-media encoding unit to convert a transmission processing for the at least one piece of media based on the determined importance rates.

30 Claims, 4 Drawing Sheets

U.S. PATENT DOCUMENTS

| | | | |
|---|---|---|---|
| 6,778,596 B1 * | 8/2004 | Tzannes | 375/222 |
| 6,976,090 B2 * | 12/2005 | Ben-Shaul et al. | 709/246 |
| 7,082,572 B2 * | 7/2006 | Pea et al. | 715/720 |
| 7,266,611 B2 * | 9/2007 | Jabri et al. | 709/231 |
| 7,526,565 B2 * | 4/2009 | Amini et al. | 709/231 |
| 8,199,825 B2 * | 6/2012 | Shen | 375/240.24 |
| 2001/0047423 A1 | 11/2001 | Shao et al. | |
| 2003/0067877 A1 * | 4/2003 | Sivakumar et al. | 370/232 |
| 2003/0083870 A1 | 5/2003 | Lee et al. | |
| 2005/0076136 A1 | 4/2005 | Cho et al. | |

FOREIGN PATENT DOCUMENTS

JP     2007-129745     5/2007

OTHER PUBLICATIONS

International Search Report mailed Jan. 21, 2009 for PCT/KR2008/004787.

\* cited by examiner (A)

(B)

SYSTEM AND METHOD FOR PRODUCING IMPORTANCE RATE-BASED RICH MEDIA, AND SERVER APPLIED TO THE SAME

CROSS REFERENCE TO RELATED APPLICATION

This application claims the priority of Korean Patent Application No. 10-2007-0116828, filed on Nov. 15, 2007and Korean Patent Application No. 10-2007-0118142, filed on Nov. 19, 2007in the KIPO (Korean Intellectual Property Office), the disclosure of which are incorporated herein in their entirety by reference. Further, this application is the National Phase application of International Application No. PCT/KR2008/004787, filed Aug. 18, 2008, which designates the United States and was published in English. Each of these applications is hereby incorporated by reference in their entirety into the present application.

TECHNICAL FIELD

The present invention relates to a method for transmitting rich media, and more particularly to a rich media server, a rich media transmission system, and a rich media transmission method, which enables optimal rich media to be transmitted according to a network environment by taking into consideration the network environment and the importance rates of pieces of media constituting rich media when transmitting the rich media.

BACKGROUND ART

The method and system for providing multimedia content service based on communication systems through a wired communication network such as a very-high speed Internet or through a wireless communication network such as IMT 2000 are being noted.

In particular, functions of transmitting/receiving still pictures, moving pictures, and music files such as MP3 files, as well as voice and text, through wired/wireless terminals have been added to the terminals, or have been implemented through connection with external apparatuses. Accordingly, the technical foundation for transmitting/receiving multimedia content files by wire or wirelessly is being laid down, and the technical foundation for enabling the consumers to create multimedia content files by themselves and to spread the created multimedia content files through wired/wireless communication networks is being laid down also.

Meanwhile, since a user terminal constituted by a wired or wireless terminal cannot have a media reproduction-related performance capable of reproducing all innumerable media (e.g. still pictures and moving pictures) provided as multimedia content files, generation of media which cannot be reproduced is inevitable.

There are innumerable types of media, including text, a still picture, a moving picture, etc., wherein types of the audio include mpa, mp3, mp2, wma, way, etc. based on file extensions for reproduction, and types of the moving pictures include wmv, avi, divx, asf, mpg, etc. based on file extensions for reproduction.

Since innumerable types of media exist, as described above, it is not easy for a user terminal to have a codec capable of reproducing all types of media.

Moreover, since the user terminal generally has relatively lower processing capability than a personal computer (PC) in terms of performance of reproducing various media, the user terminal has a poor processing capability in terms of hardware performance required for displaying corresponding media on a screen of the user terminal, which, together with the fact that the mobile terminal has no codec, limits media which can be reproduced.

Additionally explaining the hardware s processing capability of the user terminal, the hardware s processing capability frequently reaches its limit when reproducing two or more pieces of media, rather than when reproducing one piece of media.

Generally, a user terminal reproducing two or more pieces of media (e.g. moving pictures) includes a memory for storing compressed moving-picture files, a first decoder for decompressing and outputting a first moving picture file stored in the memory, a second decoder for decompressing and outputting a second moving picture file stored in the memory, an image processor for combining and outputting moving picture frames output from the first and second decoders, a display unit for displaying data output from the image processor, and a controller for executing a process for re-production of media.

The memory may be one or more flash memories, one or more hard disks, one or more optical disk storage devices, or a combination thereof.

Each of the first and second decoders is constituted by a digital signal processor which has a flexible mechanism capable of reproducing files compressed in a plurality of formats. Each decoder may support one or more formats among MPEG-4, H.263, MPEG-2, etc.

Although the two decoders operate at the same time, the two decoders may reproduce moving picture files of mutually different formats.

Each decoder reproduces a specified moving-picture file, starting at an appointed time point. For each decoder, a double-speed play function, a low-speed play function, etc. are supported.

Decoders having these functions are commercialized and provided, and codecs associated with the decoders decompress files and output image frames in standard formats, such as YUV or RGB.

The image processor may enlarge or reduce the respective input image frames, or may combine two images.

For example, two moving pictures may be reduced and displayed on a screen divided into two areas, respectively. Otherwise, one moving picture frame may be displayed as a main screen over the entire screen, while the other moving picture frame is reduced and displayed in the form of Picture-In-Picture (PIP).

However, such a conventional user terminal can reproduce and output two pieces of media, especially, two moving pictures, on a terminal s screen at the same time, but it must have superior performance in order to reproduce three or more moving pictures at the same time. Also, since all conventional user terminals are not designed to reproduce two moving pictures through the internal operation thereof, a moving picture which cannot be reproduced in a user terminal may appear.

Moreover, during a service where predetermined media are provided from a server to a user terminal, when one or more pieces of media constituting each element are lost due to transmission environments while they are being transmitted to the user terminal, a negative effect is exerted upon the overall service performance. Therefore, generally, the server retransmits lost media, or transmits an error correction code so that media can be recovered when a loss occurs in the media.

However, reflectively transmitting an error correction code, or retransmitting corresponding media in order to recover a media s loss is inefficient in terms of bandwidth limitation in communication environments, and in terms of service operation.

Therefore, a method for overcoming these problems is required.

DISCLOSURE OF INVENTION

Technical Problem

Therefore, the present invention has been made in view of the above-mentioned problems, and an object of the present invention is to provide a system and method for providing media based on importance rates, and a server applied to the same, which controls a media transmission method in such a manner that a server, which responds to an access of a user terminal to receive a service provided based on media, extracts one or more pieces of media based on media reproduction-related data for the user terminal, determines importance rates of the extracted pieces of media, and changes transmission processing for the extracted pieces of media based on the determined importance rates so as to either transmit only pieces of media having a high importance rate, or to first transmit pieces of media having a high importance rate and to later transmit pieces of media having a low importance rate.

In addition, another object of the present invention is to provide a system and method for providing media based on importance rates, and a server applied to the same, in which a server, which responds to an access of a user terminal for receiving a service provided based on media, extracts one or more pieces of corresponding media based on media reproduction-related data for the user terminal, either executes the service provided based on media or determines importance rates of the extracted pieces of media by considering use of the service by the user, controls the amount of error correction code to vary according to the importance rates of the pieces of media, and transmits the controlled amount of error correction code to the user terminal.

Technical Solution

In order to achieve the above-mentioned object, there is provided a rich media server for transmitting rich media through a network, the rich media server including: an interfacing unit for communicating with a terminal, which requests rich media; a media processing unit for processing at least one piece of media corresponding to the request; a rich-media encoding unit for encoding at least one piece of media, which is output from the media processing unit, to produce rich media, and outputting the rich media to the interfacing unit in order to provide the rich media to the terminal; and a controller for determining importance rates of pieces of media constituting the rich media, based on reproduction information of the rich media, and controlling at least one of the media processing unit and the rich-media encoding unit to convert a transmission processing for the at least one piece of media based on the determined importance rates.

Preferably, the controller determines an importance rate of each piece of media included in the rich media, based on at least one among whether or not the piece of media is a necessary element for configuration of the rich media, a duration time during which the piece of media is displayed in rich media, whether or not a re-transmission request for the piece of media is available, the number of pieces of reference media which utilize or refer to the piece of media, and a producer-specified importance rate specified for the piece of media by a producer upon production.

Preferably, the controller calculates a priority index of each piece of media included in the rich media, based on a priority index calculation equation, Priority Index=$\{W1$ (Duration Time)$+W2$ (The Number of pieces of reference media)$+W3$ (Producer-Specified Importance Rate)$\}*f1$ (Necessity or Non-necessity)$*f2$ (retransmittability or non-retransmittability), and determines a piece of media having a high priority index to have a high importance rate, in which $W1$ to $Wn$ and $f1$ to $fn$ represent functions for calculating an importance rate for each variable.

Preferably, the controller stores a transmission control table, which includes transmission capacity information for controlling an amount of transmission of the rich media according to each bandwidth of the network, in advance, and controls an amount of transmission of the media based on the transmission control table and bandwidth information of the network.

Preferably, the transmission control table includes transmission bit rate information for controlling a transmission bit rate of the media according to each bandwidth of the network, and the controller controls the media processing unit to control the bit rate of the media based on the transmission control table and the bandwidth information of the network.

Preferably, the controller controls the media processing unit to increase or decrease the bit rate of the media in accordance with the transmission bit rate information corresponding to the bandwidth of the network, based on the transmission control table and the bandwidth information of the network.

Preferably, the transmission control table includes transmission selection information for selecting whether or not the media is to be transmitted according to each bandwidth of the network, and the controller controls the rich-media encoding unit to remove at least one piece of media having a low importance rate from among at least one piece of media output from the media processing unit, based on the transmission selection information of the transmission control table and the bandwidth information of the network, and to encode remaining media so as to produce the rich media.

Preferably, the transmission control table includes limit delay time information for a transmission delay time of the rich media transmitted through the network, and the controller controls the rich-media encoding unit to encode and sequentially output at least one piece of media received from the media processing unit in a sequence from a piece of media having a higher importance rate to a piece of media having a lower importance rate when a transmission delay time of the network is equal to or greater than the limit delay time information of the transmission control table.

Preferably, the controller controls an amount of error correction code for the at least one piece of media according to determined importance rates.

Preferably, when the at least one piece of media corresponds to media of an importance level, the controller increases the amount of error correction code for the at least one piece of media based on a communication bandwidth.

Preferably, when the at least one piece of media does not correspond to media of an importance level, the controller decreases the amount of error correction code for the at least one piece of media based on a communication bandwidth.

Preferably, the controller monitors a transmission rate of at least one piece of media including the error correction code, and again controls the amount of error correction code for the at least one piece of media, based on a transmission bit rate control signal generated as a result of the monitoring.

Meanwhile, according to another aspect of the present invention, there is provided a system for transmitting rich media, the system including: a terminal for requesting rich media through a network; and a rich media server which includes an interfacing unit for communicating with the terminal, a media processing unit for processing at least one piece of media corresponding to the request, a rich-media encoding unit for encoding at least one piece of media, output from the media processing unit, to produce rich media, and outputting the rich media to the interfacing unit in order to provide the rich media to the terminal, and a controller for determining importance rates of pieces of media constituting the rich media based on reproduction information of the rich media, and controlling at least one of the media processing unit and the rich-media encoding unit to convert a transmission processing for the at least one piece of media based on the determined importance rates.

Preferably, the controller determines an importance rate of each piece of media included in the rich media, based on at least one among whether or not the piece of media is a necessary element for configuration of the rich media, a duration time during which the piece of media is displayed in rich media, whether or not a re-transmission request for the piece of media is available, the number of pieces of reference media which utilize or refer to the piece of media, and a producer-specified importance rate specified for the piece of media by a producer upon production.

Preferably, the controller calculates a priority index of each piece of media included in the rich media, based on a priority index calculation equation, Priority Index={$W1$ (Duration Time)+$W2$ (The Number of pieces of reference media)+$W3$ (Producer-Specified Importance Rate)}*$f1$ (Necessity or Non-necessity)*$f2$ (retransmittability or non-retransmittability), and determines a piece of media having a high priority index to have a high importance rate, in which $W1$ to $Wn$ and $f1$ to $fn$ represent functions for calculating an importance rate for each variable.

Preferably, the controller stores a transmission control table, which includes transmission capacity information for controlling an amount of transmission of the rich media according to each bandwidth of the network, in advance, and controls an amount of transmission of the media based on the transmission control table and bandwidth information of the network.

Preferably, the transmission control table includes transmission bit rate information for controlling a transmission bit rate of the media according to each bandwidth of the network, and the controller controls the media processing unit to control the bit rate of the media based on the transmission control table and the bandwidth information of the network.

Preferably, the controller controls the media processing unit to increase or decrease the bit rate of the media in accordance with the transmission bit rate information corresponding to the bandwidth of the network, based on the transmission control table and the bandwidth information of the network.

Preferably, the transmission control table includes transmission selection information for selecting whether or not the media is to be transmitted according to each bandwidth of the network, and the controller controls the rich-media encoding unit to remove at least one piece of media having a low importance rate from among at least one piece of media output from the media processing unit, based on the transmission selection information of the transmission control table and the bandwidth information of the network, and to encode remaining media so as to produce the rich media.

Preferably, the transmission control table includes limit delay time information for a transmission delay time of the rich media transmitted through the network, and the controller controls the rich-media encoding unit to encode and sequentially output at least one piece of media received from the media processing unit in a sequence from a piece of media having a higher importance rate to a piece of media having a lower importance rate when a transmission delay time of the network is equal to or greater than the limit delay time information of the transmission control table.

Preferably, the controller controls an amount of error correction code for the at least one piece of media according to determined importance rates.

Preferably, when the at least one piece of media corresponds to media of an importance level, the controller increases the amount of error correction code for the at least one piece of media based on a communication bandwidth.

Preferably, when the at least one piece of media does not correspond to media of an importance level, the controller decreases the amount of error correction code for the at least one piece of media based on a communication bandwidth.

Preferably, the controller monitors a transmission rate of at least one piece of media including the error correction code, and again controls the amount of error correction code for the at least one piece of media, based on a transmission bit rate control signal generated as a result of the monitoring.

Preferably, the rich media server further includes a media database, which stores at least one piece of media for providing the rich media in response to the request of the terminal, and minimum specifications of a terminal capable of reproducing the media, in advance.

Preferably, the terminal provides the rich media server with information on the type of the terminal, and information on a reproducer for reproducing the rich media when requesting the rich media to the rich media server.

Preferably, the controller compares the type information and the information on the rich-media reproducer, provided from the terminal, with the minimum specifications of media corresponding to the requested rich media, determines if the terminal can reproduce the rich media, and controls the media processing unit to generate the rich media with media which can be reproduced.

Meanwhile, according to still another aspect of the present invention, there is provided a method for providing media based on importance rates, the method including the steps of: (a) transmitting a response to a user terminal which requests a rich media service; (b) extracting media reproduction information corresponding to the request, extracting at least one piece of media corresponding to a service provided based on media according to the media reproduction information, and encoding the at least one piece of media to produce rich media; (c) determining an importance rate of each piece of media constituting the rich media; and (d) converting a transmission processing for the at least one piece of media based on a result of the determination for the importance rate, and transmitting the at least one piece of media.

Preferably, in step (c), the importance rate of the at least one piece of media, based on at least one among whether or not the piece of media is a necessary element for the service provided based on media, a duration time during which the piece of media is reproduced through the user terminal, the number of pieces of related reference media, an importance level index specified at a media production stage, and whether or not a retransmission request for the piece of media is available, and whether or not the user terminal can make a retransmission request when the at least one piece of media has been lost due to a media transmission environment.

Preferably, in step (d), according to a result of the determination for the importance rate, the amount of error correction code for the at least one piece of media is controlled, or a transmission protocol for the at least one piece of media is established.

ADVANTAGEOUS EFFECTS

According to the present invention, a server, which responds to an access of a user terminal for receiving a service provided based on media, extracts one or more pieces of corresponding media based on media reproduction-related data for the user terminal, either executes the service provided based on media or determines importance rates of the extracted pieces of media by considering use of the service by the user, and performs different transmission processing operations according to pieces of media, which are classified according to the importance rates thereof, so that it is possible to efficiently transmit corresponding media in a communication environment having limited bandwidth, and it is possible to ensure continuity of service execution even though the server fails in transmitting some media or service elements having low importance rates to the user terminal.

BRIEF DESCRIPTION OF THE DRAWINGS

The foregoing and other objects, features and advantages of the present invention will become more apparent from the following detailed description when taken in conjunction with the accompanying drawings in which.

MODE FOR THE INVENTION

Hereinafter, preferred embodiments of the present invention will be described with reference to the accompanying drawings.

Figure 1:
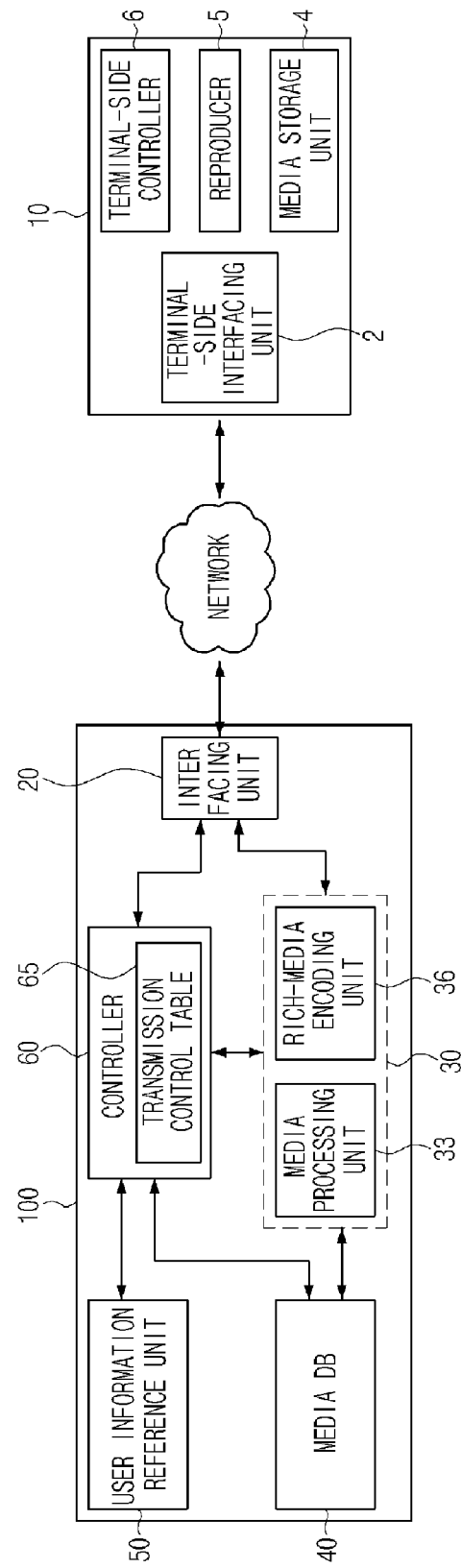
FIG. 1 is a block diagram illustrating the configuration of a rich media transmission system according to an exemplary embodiment of the present invention.
Figure 2:
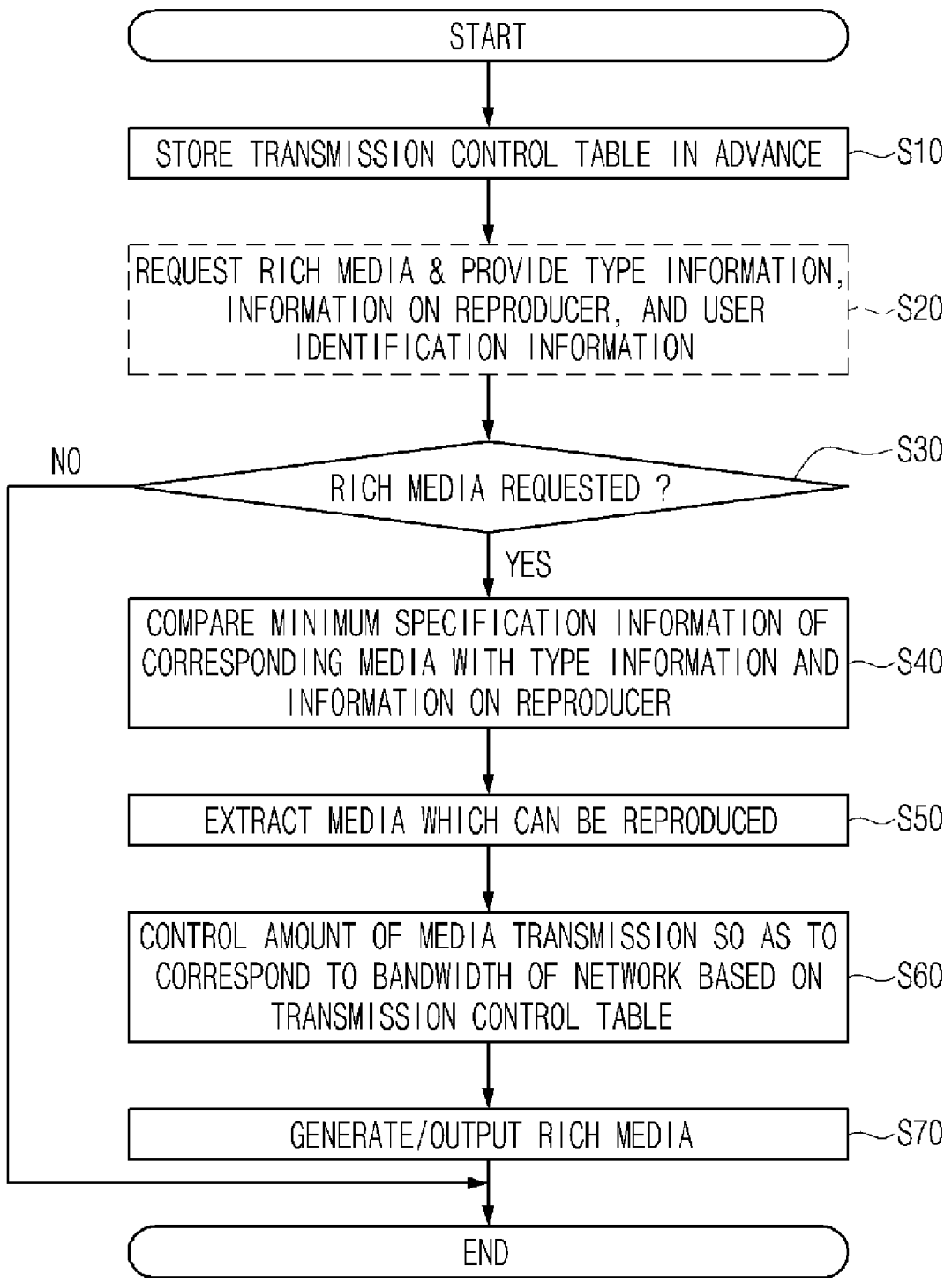
FIG. 2 is a flowchart illustrating a control flow of a rich media transmission method according to an exemplary embodiment of the present invention.

FIG. 1 is a block diagram illustrating the configuration of a rich media transmission system according to an exemplary embodiment of the present invention. As shown in FIG. 1, a rich media transmission system includes a terminal 10 for requesting rich media, and a rich media server 100 for generating and providing rich media through a network.

The terminal 10 accesses the rich media server 100 through a network, and requests the rich media server 100 to transmit rich media desired by the user of the terminal 10. The terminal 10 includes various electronic devices, including a general personal computer (PC), a portable terminal, etc. Although FIG. 1 shows only one terminal 10, the terminal 10 capable of accessing the rich media server 100 through a network is plural in number.

In more detail on the configuration of the terminal 10, the terminal 10 includes a terminal-side interfacing unit 2 for communicating with the rich media server 100 through the network, a terminal-side controller 6 for requesting the rich media server 100 to transmit rich media desired by the user, a media storage unit 4 for storing requested rich media when the requested rich media are received, and a reproducer 5 for reproducing the requested rich media.

The terminal-side controller 6 has stored information (e.g. a product model code) on the type of the terminal 10 and, information on the reproducer, including a resolution supported by the reproducer 5 and specifications of the reproducer 5, in advance. When requesting the rich media server 100 to transmit rich media, the terminal-side controller 6 may provide information on the type of the terminal 10 and information on the reproducer to the rich media server 100. In addition, the terminal-side controller 6 may provide user identification information to the rich media server 100.

As shown in FIG. 1, the rich media server 100 includes an interfacing unit 20, a combination processor 30, a media DB 40, a user information reference unit 50, and a controller 60.

The interfacing unit 20 acts as a communication unit to communicate with the terminal 10, which requests rich media. Such an interfacing unit 20 has only to have a construction corresponding to that of the terminal-side interfacing unit 2.

The combination processor 30 extracts at least one piece of media from the media DB 40, and generates rich media to be provided to the terminal 10. The combination processor 30 includes a media processing unit 33 for processing at least one piece of media corresponding to that requested by the terminal 10, and a rich-media encoding unit 36 for combining/encoding the at least one piece of media received from the media processing unit 33 so as to produce rich media to be provided to the terminal 10, and outputting the produced rich media to the interfacing unit 20.

The media processing unit 33 extracts at least one piece of media, selected to be provided to the terminal 10 by the controller 60, which will be described later, from the media DB 40, and then processes the extracted media in a form which can be processed by the rich-media encoding unit 36. When media extracted from the media DB 40 correspond to a scalable coded moving picture, the media processing unit 33 processes the extracted media to produce a moving-picture stream having a resolution, a bit rate, etc., which can be processed by the rich-media encoding unit 36. Also, when there is no scalable coded moving picture in the media DB 40, and media extracted from the media DB 40 correspond to a selective moving picture produced in various encoding standards, the media processing unit 33 processes the extracted media according to a corresponding moving picture standard to produce a moving picture stream which can be processed by the rich-media encoding unit 36. In addition, when media extracted from the media DB 40 are required to be compressed using another codec, the media processing unit 33 converts the extracted media to generate a moving picture. Accordingly, the media processing unit 33 can convert not only a moving picture, but also media having relatively small amounts, such as a still picture, an animation, etc., to be reproduced as rich media through the terminal 10.

The rich-media encoding unit 36 combines and encodes at least one piece of media received from the media processing unit 33 so as to produce rich media to be provided to the terminal 10, and outputs the rich media to the interfacing unit 20. That is, the rich-media encoding unit 36 combines at least one piece of media into a rich media screen, so that a requested rich media screen can be provided to the terminal 10.

Also, the rich-media encoding unit 36 may have a template conversion function. That is, the rich-media encoding unit 36 may construct rich media based on an appropriate template, that is determined in consideration of coordinates of media included in various scene information contained in a rich media screen, a method of receiving an input of the terminal 10, etc., which vary depending on the type of the terminal 10 and the specifications of the reproducer 5, and then provide the constructed rich media to the terminal 10. In this case, the various scene information contained in a rich media screen may be provided from the media processing unit 33, which extracts and processes each piece of media.

The media DB 40 stores at least one piece of media to provide rich media corresponding to a request of the terminal 10. Here, the stored media may include various types of media, including scalable coded moving pictures, selective moving pictures produced in various encoding standards, still images, animations, etc. In addition, the media DB 40 has stored information on minimum specifications of terminals, which can reproduce pieces of stored media, according to each piece of stored media in advance.

When receiving a request for rich media from the terminal 10, the controller 60 controls the media processing unit 33 and the rich-media encoding unit 36 to extract at least one piece of media corresponding to the requested media from the media DB 40, to generate rich media, and to output the generated rich media to the terminal 10.

When receiving the information on the type of the terminal 10 and the information on the reproducer from the terminal 10, which requests rich media, the controller 60 compares information on the minimum specifications of pieces of media corresponding to requested rich media, with the information on the type of the terminal 10 and the information on the reproducer, based on information on minimum specifications according to each piece of media stored in the media DB 40. Then, the controller 60 determines if the terminal 10 can reproduce the requested rich media, and controls the media processing unit 33 to extract pieces of reproducible media and to generate rich media. Accordingly, the media processing unit 33 extracts and processes pieces of reproducible media in order to provide the terminal 10 with rich media constituted by the pieces of media, which can be reproduced by the terminal 10.

The controller 60 has stored a transmission control table 65, which includes transmission capacity information for controlling the amount of rich-media transmission according to the bandwidths of networks, in advance. The controller 60 controls at least one of the media processing unit 33 and the rich-media encoding unit 36 to control the amount of media transmission based on bandwidth information of the network and the transmission control table 65.

In more detail, the transmission control table 65 may include transmission bit rate information for controlling transmission bit rates of media according to the bandwidths of networks.

In this case, the controller 60 identifies bandwidth information of the network to communicate with the current terminal 10, and controls the media processing unit 33 to increase or decrease the bit rate of each piece of media according to transmission bit rate information corresponding to the bandwidth of the current network, based on the bandwidth information of the current network and the transmission control table 65. Accordingly, when processing each piece of media extracted from the media DB 40, the media processing unit 33 decreases the bit rate of each piece of media before providing the media to the rich-media encoding unit 36 when the bandwidth of a network is narrow, and maintains or increases the bit rate of each piece of media before providing the media to the rich-media encoding unit 36 when the bandwidth of a network is wide.

Therefore, according to the rich media transmission system of the present invention, when the rich media server 100 transmits rich media through a network having limited bandwidth, the rich media server 100 controls the amount of rich media transmission according to the bandwidth of the network by controlling the bit rates of media in consideration of the bandwidth of the network and generating/transmitting rich media, so that it is possible to adaptively provide important information to the terminal 10 without delay or loss.

According to another exemplary embodiment of the present invention, the transmission control table 65 may include transmission selection information for selecting whether or not each piece of media is to be transmitted according to the bandwidths of networks.

In this case, the controller 60 may determine an importance rate of each piece of media included in rich media, and control the rich-media encoding unit 36 to remove at least one piece of media having a low importance rate from among one or more pieces of media received from the media processing unit 33, and to encode the remaining media to produce rich media, based on the bandwidth information of the current network and the transmission selection information of the transmission control table 65. Then, the rich-media encoding unit 36 omits at least one piece of media, which has a low importance rate, from among pieces of media received from the media processing unit 33, combines and encodes the remaining media, that is, pieces of media having relatively higher importance rates, to produce rich media, and outputs the rich media to the interfacing unit 20.

In this case, the controller 60 may determine an importance rate of each piece of media included in rich media, based on at least one among whether or not the piece of media is a necessary element for configuration of the rich media (e.g. necessity=0, and non-necessity=1), a duration time during which the piece of media is displayed in rich media, whether or not a retransmission request for the piece of media is available (e.g. retransmittability=0, and non-retransmittability=1), the number of pieces of reference media which utilize or refer to the piece of media (e.g. three or more pieces=2, one or two pieces=1, and none=0), and a producer-specified importance rate specified for the piece of media by a producer upon production (e.g. very importance=2, importance=1, and unimportance=0). In this case, while performing a procedure of receiving the upload of each piece of media from a producer, and generating one rich media screen by combining the received pieces of media according to a predetermined rich media generation routine, the controller 60 of the rich media server 100 may identify whether or not each piece of media is a necessary element, a duration time, whether or not a retransmission request is available, the number of pieces of reference media, and a producer-specified importance rate, with respect to each piece of media.

A priority index for determining the importance rate of each piece of media by the controller 60 is calculated by:

$$\text{Priority Index} = \{W1 \text{ (Duration Time)} + W2 \text{ (The Number of pieces of reference media)} + W3 \text{ (Producer-Specified Importance Rate)}\} * f1 \text{ (Necessity or Non-necessity)} * f2 \text{ (retransmittability or non-retransmittability)}.$$

In the equation, W1 to Wn and f1 to fn represent functions for calculating importance rates for the respective variables.

In this case, it is preferred that the controller 60 calculates priority indexes for the respective pieces of media included in rich media, and determines a piece of media having a higher priority index to have a higher importance rate.

Therefore, according to the rich media transmission system of the present invention, when transmitting rich media through a network having limited bandwidth, the rich media server 100 can control the amount of rich media transmission according to the bandwidth of the network by omitting at least one piece of media having a relatively lower importance rate, and generating/transmitting rich media constituted by only pieces of media having relatively higher importance rates in consideration of the bandwidth of the network, so that it is possible to adaptively provide important information to the terminal 10 without delay or loss.

Also, according to still another exemplary embodiment of the present invention, the transmission control table 65 may include limit delay time information for a transmission delay time of rich media transmitted through a network.

In this case, the controller 60 identifies the current transmission delay time of a network, through which rich media is to be transmitted to the terminal 10. When the current transmission delay time is equal to or greater than the value of the limit delay time information stored in the transmission control table 65, the controller 60 may determine the importance rate of each piece of media included in the rich media, and control the rich-media encoding unit 36 to encode and sequentially output at least one piece of media received from the media processing unit 33 in the sequence from a piece of media having a higher importance rate to a piece of media having a lower importance rate. Then, the rich-media encoding unit 36 encodes and outputs a piece of media having a higher importance rate prior to outputting a piece of media having a lower importance rate, from among pieces of media received from the media processing unit 33, to the interfacing unit 20.

In this case, the controller 60 can identify the transmission delay time of the network through use of a conventional scheme for identifying a delay time, such as a scheme of identifying a transmission delay time based on an echo signal from the terminal 10 in response to a predetermined signal which has been transmitted from the rich media server 100 to the terminal 10.

Also, the transmission control table 65 may include transmission selection information for selecting whether or not media is to be transmitted according to each transmission delay time period of the network.

In this case, the controller 60 may identify the current transmission delay time of a network, through which rich media is to be transmitted to the terminal 10, and control the rich-media encoding unit 36 to remove at least one piece of media having a relatively lower importance rate from among one of more pieces of media received from the media processing unit 33, and to encode the remaining pieces of media to produce rich media, based on the current transmission delay time and the transmission selection information stored in the transmission control table 65. Then, the rich-media encoding unit 36 omits at least one piece of media having a relatively lower importance rate from among pieces of media received from the media processing unit 33, combines and encodes pieces of media having relatively higher importance rates to produce rich media, and outputs the rich media to the interfacing unit 20.

Here, the method of determining the importance rate of each piece of media included in the rich media by the controller 60 is the same as that described in the determination procedure according to the aforementioned embodiment of the present invention, so a detailed description thereof will be omitted.

Therefore, according to the rich media transmission system of the present invention, when a very large transmission delay occurs in transmitting rich media from the rich media server 100 to the terminal 10, important pieces of media from among pieces of media constituting the rich media are first transmitted, so that it is possible to adaptively provide important information to the terminal 10 without delay or loss, regardless of transmission delay.

In addition, according to the rich media transmission system of the present invention, when transmitting rich media to the terminal 10, the rich media server 100 omits at least one piece of media having a relatively lower importance rate, and generates/transmits rich media constituted by only pieces of media having relatively higher importance rates in consideration of a transmission delay time caused by a network having limited bandwidth, so that it is possible to adaptively provide important information to the terminal 10 without delay or loss, regardless of transmission delay.

In addition, the rich media server 100 may further include the user information reference unit 50 for storing information on favorite types of media according to each user in advance, or for storing information on a history of types of previously requested rich media according to each user.

In this case, when controlling the media processing unit 33 to extract pieces of media corresponding to rich media to be provided to the terminal 10, the controller 60 can control the media processing unit 33 to extract and process pieces of media suitable for the corresponding user among pieces of media, which can be reproduced by the terminal 10, based on user identification information input from the terminal 10.

Although the embodiments of the present invention has been described regarding a case where the controller 60 is separated configured, they are illustrative purposes only. That is, the configuration and function of the controller 60 may be included in the rich-media encoding unit 36.

As described above, according to the rich media transmission system of the present invention, when the rich media server 100 transmits rich media through a network having limited bandwidth, the rich media server 100 controls the amount of rich media transmission according to the bandwidth of the network in such a manner as to control the bit rates of media in consideration of the bandwidth of the network and to generate the rich media, or so as to omit at least one piece of media having a relatively lower importance rate and to generate/transmit rich media having only pieces of media having relatively higher importance rates, so that it is possible to adaptively provide important information to the terminal 10, without delay or loss.

In addition, according to the rich media transmission system of the present invention, the rich media server 100 prepares against transmission delay by first transmitting important pieces of media from among pieces of media constituting the rich media, and when a very large transmission delay occurs in transmitting rich media from the rich media server 100 to the terminal 10, the rich media server 100 omits at least one piece of media having a relatively lower importance rate, and generates/transmits rich media with only pieces of media having relatively higher importance rates according to each transmission delay time period by taking a transmission delay time into consideration, so that it is possible to adaptively provide important information to the terminal 10 without delay or loss, regardless of transmission delay.

Hereinafter, a transmission method in the rich media transmission system having the above configuration according to the present invention will be described in brief. For convenience of description, the same reference numerals as those used in FIG. 1 are used to designate the same elements in the following description.

First, the controller 60 of the rich media server 100 stores the transmission control table 65 for controlling the amount of rich-media transmission according to the bandwidths of networks, in advance (step 10). Then, the terminal 10 used by the user, who desires to view rich media, transmits a request for desired rich media (step 20). In this case, it is preferred that the terminal 10 provides the rich media server 100 with information on the type of the terminal 10, the information on the reproducer, and user identification information.

The controller 60 of the rich media server 100 determines if the terminal 10 requests rich media (step 30). When rich media is requested, the controller 60 compares information on the minimum specifications of pieces of media corresponding to the requested rich media, with the information on the type of the terminal 10 and the information on the reproducer, based on information on minimum specifications according to each piece of media stored in the media DB 40 (step 40). Then, the controller 60 determines if the terminal 10 can reproduce the requested rich media, and controls the media processing unit 33 to extract and process pieces of media which can be reproduced by the terminal 10 (step 50). Accordingly, in order to provide the terminal 10 with rich media constituted by pieces of media, which can be reproduced by the terminal 10, the media processing unit 33 extracts and processes corresponding pieces of media.

Then, the controller 60 identifies bandwidth information of the network to communicate with the current terminal 10, and controls at least one of the media processing unit 33 and rich-media encoding unit 36 to control the amount of media transmission, based on the bandwidth information of the network and the transmission control table 65 (step 60). Then, according to the control of the controller 60, the media processing unit 33 and the rich-media encoding unit 36 generate rich media, the transmission amount of which has been controlled to correspond to the bandwidth information of the network, and transmit the generated rich media to the terminal 10 (step 70).

Meanwhile, the transmission control table 65 pre-stored in step 10 may include transmission bit rate information for controlling the transmission bit rate of media according to the bandwidths of networks. In this case, in step 60, the controller 60 may control the media processing unit 33 to increase or decrease the bit rate of each piece of media according to transmission bit rate information corresponding to the bandwidth of the current network, based on the bandwidth information of the current network and the transmission control table 65. Accordingly, when processing at least one piece of media extracted from the media DB 40, the media processing unit 33 decreases the bit rate of each piece of media and provides the media to the rich-media encoding unit 36 when the bandwidth of a network is narrow, and maintains or increases the bit rate of each piece of media and provides the media to the rich-media encoding unit 36 when the bandwidth of a network is wide.

Meanwhile, according to another exemplary embodiment of the present invention, the transmission control table 65 pre-stored in step 10 may include transmission selection information for selecting whether or not each piece of media is to be transmitted according to the bandwidths of networks.

Figure 3:
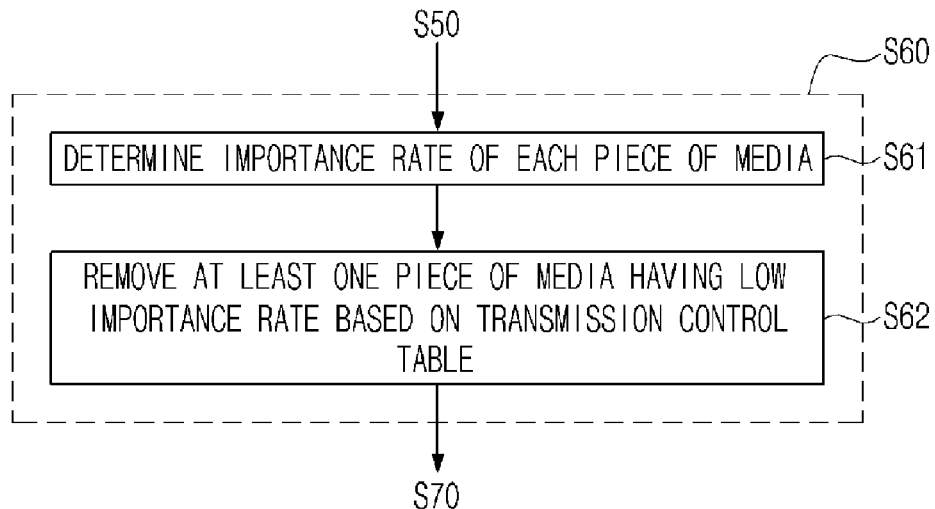
FIG. 3A is a partial flowchart showing another example for controlling the amount of transmission in the rich media transmission method according to another exemplary embodiment of the present invention.
FIG. 3B is a partial flowchart illustrating steps added to the rich media transmission method according to still another exemplary embodiment of the present invention.
Figure 3:
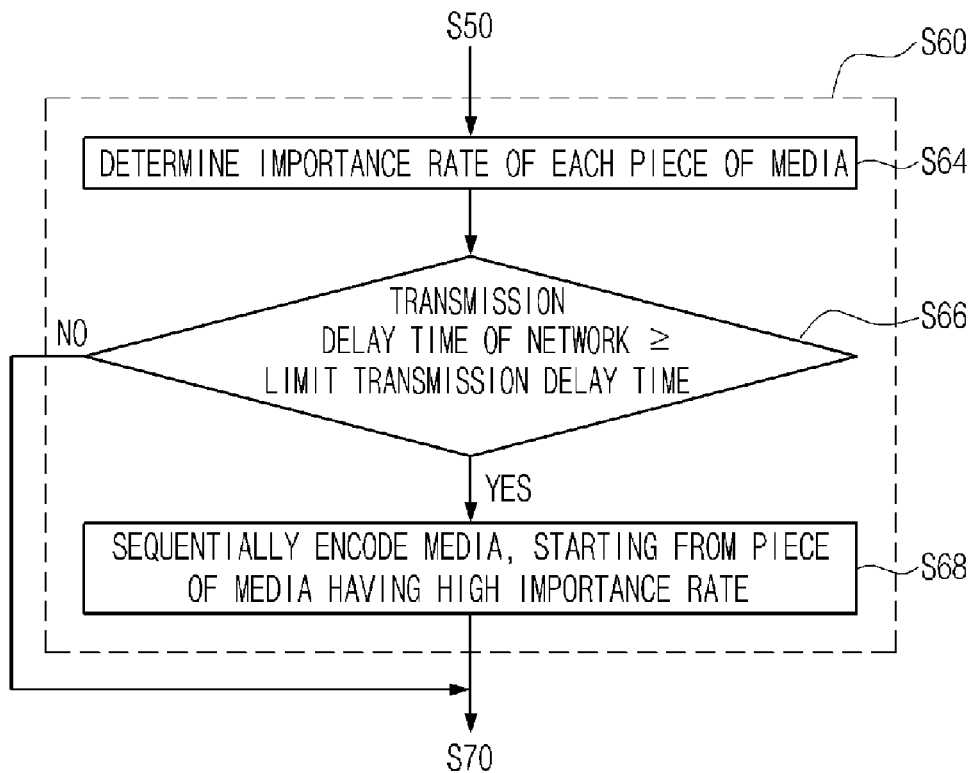

In connection with this, step 60 will now be described in more detail with reference to FIG. 3A. The controller 60 determines an importance rate of each piece of media included in rich media (step 61), and controls the rich-media encoding unit 36 to remove at least one piece of media, which has a low importance rate from among one or more pieces of media received from the media processing unit 33, and to encode the remaining media to produce rich media, based on the bandwidth information of a network and the transmission selection information of the transmission control table 65 (step 62). Then, the rich-media encoding unit 36 omits at least one piece of media, which has a low importance rate, from among pieces of media received from the media processing unit 33, combines and encodes the remaining media, that is, pieces of media having relatively higher importance rates, to produce rich media, and outputs the rich media to the interfacing unit 20.

Meanwhile, in step 61, the controller 60 may determine the importance rate of each piece of media included in rich media, based on at least one among whether or not the piece of media is a necessary element for configuration of the rich media (e.g. necessity=0, and non-necessity=1), a duration time during which the piece of media is displayed in rich media, whether or not a retransmission request for the piece of media is available (e.g. retransmittability=0, and non-retransmittability=1), the number of pieces of reference media which utilize or refer to the piece of media (e.g. three or more pieces=2, one or two pieces=1, and none=0), and a producer-specified importance rate specified for the piece of media by a producer upon production (e.g. very importance=2, importance=1, and unimportance=0).

In this case, while performing a procedure of receiving the upload of each piece of media from a producer, and generating one rich media screen by combining the received pieces of media according to a predetermined rich media generation routine, the controller 60 of the rich media server 100 may identify whether or not each piece of media is a necessary element, a duration time, whether or not a retransmission request is available, the number of pieces of reference media, and a producer-specified importance rate, with respect to each piece of media.

A priority index for determining the importance rate of each piece of media by the controller 60 is calculated by:

Priority Index={$W$1 (Duration Time)+$W$2 (The Number of pieces of reference media)+$W$3 (Producer-Specified Importance Rate)}*$f$1 (Necessity or Non-necessity)*$f$2 (retransmittability or non-retransmittability).

In the equation, $W$1 to $W$n and $f$1 to $f$n represent functions for calculating importance rates for the respective variables.

In this case, it is preferred that the controller 60 calculates priority indexes for the respective pieces of media included in rich media, and determines a piece of media having a higher priority index to have a higher importance rate.

Meanwhile, according to still another exemplary embodiment of the present invention, the transmission control table 65 pre-stored in step 10 may include limit delay time information for a transmission delay time of rich media transmitted through a network.

In connection with this, step 60 will now be described in more detail with reference to FIG. 3B. The controller 60 determines the importance rate of each piece of media included in rich media (step 64). Then, the controller 60 identifies the current transmission delay time of a network, through which rich media is to be transmitted to the terminal 10, and determines if the current transmission delay time is equal to or greater than the value of the limit delay time information stored in the transmission control table 65 (step 66). Next, when the current transmission delay time is equal to or greater than the value of the limit delay time information, the controller 60 controls the rich-media encoding unit 36 to encode and sequentially output one or pieces of media received from the media processing unit 33 in the sequence from a piece of media having a higher importance rate to a piece of media having a lower importance rate (step 68). Accordingly, the rich-media encoding unit 36 encodes and outputs a piece of media having a higher importance rate prior to outputting a piece of media having a lower importance rate, from among pieces of media received from the media processing unit 33, to the interfacing unit 20.

As described above, according to the rich media transmission method of the present invention, When transmitting rich media through a network having limited bandwidth, the rich media server 100 either adjusts the bit rate of media in consideration of the bandwidth of the network and generates rich media, or omits at least one piece of media having a relatively lower importance rate and generates rich media with pieces of media having a relatively higher importance rate, and then the rich media server 100 transmits the generated rich media, so that the amount of rich media transmission is controlled according to the bandwidth of the network, thereby being able to adaptively provide important information to the terminal 10 without delay or loss.

In addition, according to the rich media transmission method of the present invention, when a very large transmission delay occurs in transmitting rich media from the rich media server 100 to the terminal 10, important pieces of media from among pieces of media constituting the rich media are first transmitted, so that it is possible to adaptively provide important information to the terminal 10 without delay or loss, regardless of transmission delay.

Figure 4:
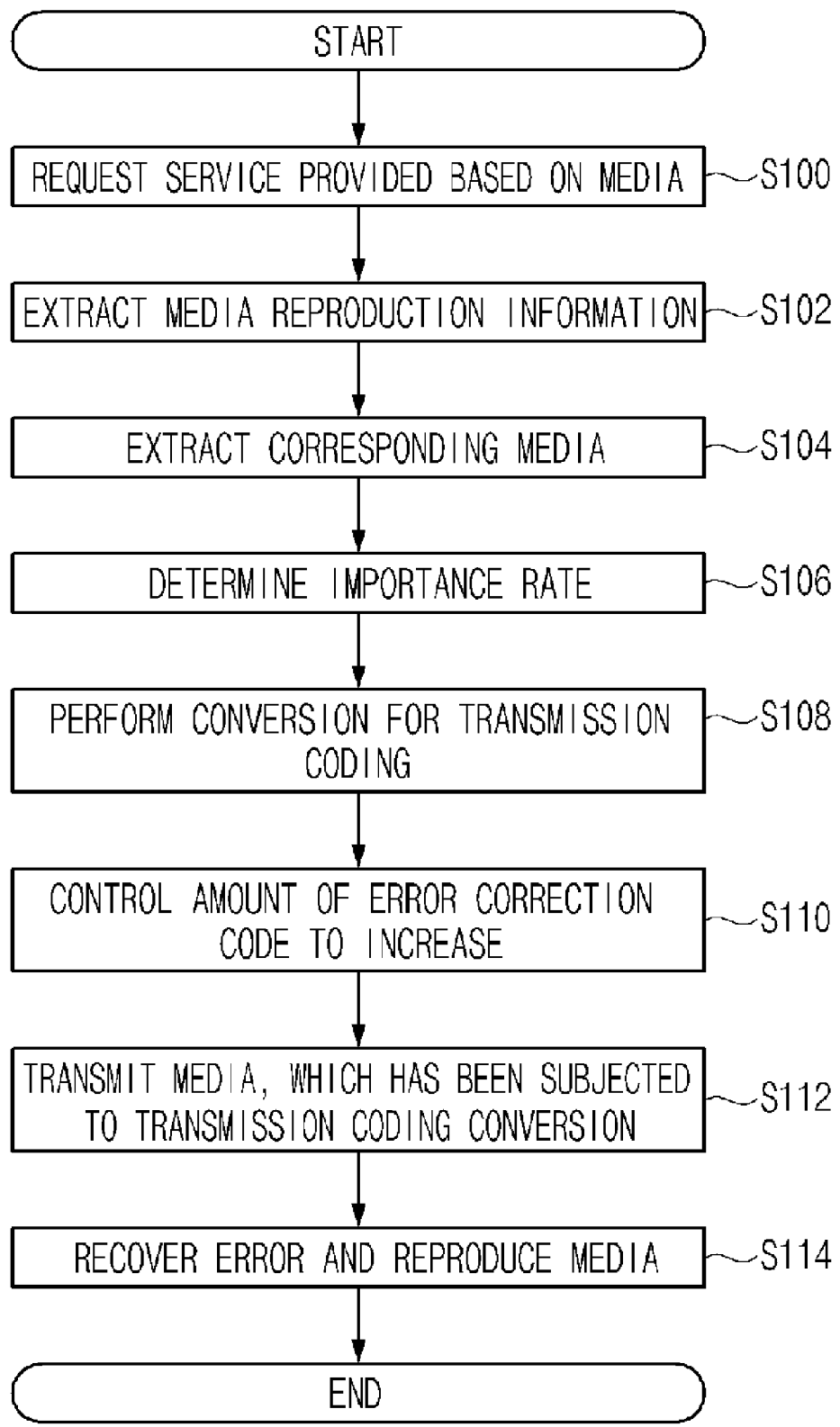
FIG. 4 is a flowchart illustrating the operation procedure of the system for providing media based on importance rates according to an exemplary embodiment of the present invention.

FIG. 4 is a flowchart illustrating the operation procedure of the system for providing media based on importance rates, which is shown in FIG. 1. The procedure shown in FIG. 4 is for illustrative purpose only. The importance rate-based media provision method starts from an access to a rich media server 100 by a terminal 10 for requesting a service provided based on media (step 100).

Thereafter, the rich media server 100 extracts media reproduction information for the terminal 10 from pre-stored media-related database through use of terminal information provided from the terminal 10 (step 102), and extracts at least one piece of media for providing the service according to the extracted media reproduction information (step 104).

Then, the rich media server 100 determines an importance rate of the extracted piece of media on the service provided based on media to be executed through the terminal 10 (step 106).

When at least one piece of media is set as a piece of media having an importance level as a result of the determination of step 106, the rich media server 100 establishes a transfer protocol corresponding to the piece of media having the importance level, increases the amount of error correction code associated with the at least one piece of media depending on the communication bandwidth, allocates the increased amount of error correction code (steps 108 and 110), and then transmits the at least one piece of media which has been subjected to a transmission coding conversion, as described above, to the terminal 10 (step 112).

Thereafter, the terminal 10 receives at least one piece of media, which has been subjected to a transmission coding conversion, restores media including errors, and reproduces restored media (step 114).

While the invention has been shown and described with reference to certain exemplary embodiments thereof, the invention is not limited to the exemplary embodiments, those skilled in the art may make various changes in form and details without departing from the scope of the invention which are defined by the appended claims, and it should be understood that the spirit and scope of the invention are to cover such various changes in form and details.

Industrial Applicability

According to the present invention, a server, which responds to an access of a user terminal for receiving a service provided based on media, extracts one or more pieces of corresponding media based on media reproduction-related data for the user terminal, either executes the service provided based on media or determines importance rates of the extracted pieces of media by considering use of the service by the user, and performs different transmission processing operations according to pieces of media, which are classified according to the importance rates thereof, and provides the pieces of media to the terminal. Accordingly, the present invention has industrial applicability because it has sufficient marketability or business possibility, and is also obviously practicable.

The invention claimed is:

1. A rich media server for transmitting rich media through a network, the rich media server comprising:
   an interfacing unit for communicating with a terminal, which requests rich media;
   a media processing unit for processing at least one piece of media corresponding to the request;
   a rich-media encoding unit for encoding at least one piece of media, which is output from the media processing unit, to produce rich media, and outputting the rich media to the interfacing unit in order to provide the rich media to the terminal; and
   a controller for determining importance rates of pieces of media constituting the rich media, based on reproduction information of the rich media, and controlling at least one of the media processing unit and the rich-media encoding unit to convert a transmission processing for the at least one piece of media based on the determined importance rates.

2. The rich media server as claimed in claim 1, wherein the controller determines an importance rate of each piece of media included in the rich media, based on at least one among whether or not the piece of media is a necessary element for configuration of the rich media, a duration time during which the piece of media is displayed in rich media, whether or not a retransmission request for the piece of media is available, the number of pieces of reference media which utilize or refer to the piece of media, and a producer-specified importance rate specified for the piece of media by a producer upon production.

3. The rich media server as claimed in claim 2, wherein the controller calculates a priority index of each piece of media included in the rich media, based on a priority index calculation equation, Priority Index={$W1$ (Duration Time)+$W2$ (The Number of pieces of reference media)+$W3$ (Producer-Specified Importance Rate)}*$f1$ (Necessity or Non-necessity) *$f2$ (retransmittability or non-retransmittability), and determines a piece of media having a high priority index to have a high importance rate, in which $W1$ to $Wn$ and $f1$ to $fn$ represent functions for calculating an importance rate for each variable.

4. The rich media server as claimed in claim 1, wherein the controller stores a transmission control table, which includes transmission capacity information for controlling an amount of transmission of the rich media according to each bandwidth of the network, in advance, and controls an amount of transmission of the media based on the transmission control table and bandwidth information of the network.

5. The rich media server as claimed in claim 4, wherein the transmission control table includes transmission selection information for selecting whether or not the media is to be transmitted according to each bandwidth of the network, and the controller controls the rich-media encoding unit to remove at least one piece of media having a low importance rate from among at least one piece of media output from the media processing unit, based on the transmission selection information of the transmission control table and the bandwidth information of the network, and to encode remaining media so as to produce the rich media.

6. The rich media server as claimed in claim 4, wherein the transmission control table includes limit delay time information for a transmission delay time of the rich media transmitted through the network, and the controller controls the rich-media encoding unit to encode and sequentially output at least one piece of media received from the media processing unit in a sequence from a piece of media having a higher importance rate to a piece of media having a lower importance rate when a transmission delay time of the network is equal to or greater than the limit delay time information of the transmission control table.

7. The rich media server as claimed in claim 4, wherein the transmission control table includes transmission bit rate information for controlling a transmission bit rate of the media according to each bandwidth of the network, and the controller controls the media processing unit to control the bit rate of the media based on the transmission control table and the bandwidth information of the network.

8. The rich media server as claimed in claim 7, wherein the controller controls the media processing unit to increase or decrease the bit rate of the media in accordance with the transmission bit rate information corresponding to the bandwidth of the network, based on the transmission control table and the bandwidth information of the network.

9. The rich media server as claimed in claim 4, wherein the controller controls an amount of error correction code for the at least one piece of media according to determined importance rates.

10. The rich media server as claimed in claim 9, wherein when the at least one piece of media corresponds to media of an importance level, the controller increases the amount of error correction code for the at least one piece of media based on a communication bandwidth.

11. The rich media server as claimed in claim 9, wherein when the at least one piece of media does not correspond to media of an importance level, the controller decreases the amount of error correction code for the at least one piece of media based on a communication bandwidth.

12. The rich media server as claimed in claim 9, wherein the controller monitors a transmission rate of at least one piece of media including the error correction code, and again controls the amount of error correction code for the at least one piece of media, based on a transmission bit rate control signal generated as a result of the monitoring.

13. A system for transmitting rich media, the system comprising:
a terminal for requesting rich media through a network; and
a rich media server which includes an interfacing unit for communicating with the terminal, a media processing unit for processing at least one piece of media corresponding to the request, a rich-media encoding unit for encoding at least one piece of media, output from the media processing unit, to produce rich media, and outputting the rich media to the interfacing unit in order to provide the rich media to the terminal, and a controller for determining importance rates of pieces of media constituting the rich media based on reproduction information of the rich media, and controlling at least one of the media processing unit and the rich-media encoding unit to convert a transmission processing for the at least one piece of media based on the determined importance rates.

14. The system as claimed in claim 13, wherein the controller determines an importance rate of each piece of media included in the rich media, based on at least one among whether or not the piece of media is a necessary element for configuration of the rich media, a duration time during which the piece of media is displayed in rich media, whether or not a retransmission request for the piece of media is available, the number of pieces of reference media which utilize or refer to the piece of media, and a producer-specified importance rate specified for the piece of media by a producer upon production.

15. The system as claimed in claim 14, wherein the controller calculates a priority index of each piece of media included in the rich media, based on a priority index calculation equation, $$\text{Priority Index} = \{W1 \text{ (Duration Time)} + W2 \text{ (The Number of pieces of reference media)} + W3 \text{ (Producer-Specified Importance Rate)}\} * f1 \text{ (Necessity or Non-necessity)} * f2 \text{ (retransmittability or non-retransmittability)},$$

and determines a piece of media having a high priority index to have a high importance rate, in which $W1$ to $Wn$ and $f1$ to $fn$ represent functions for calculating an importance rate for each variable.

16. The system as claimed in claim 13, wherein the rich media server further comprises a media database, which stores at least one piece of media for providing the rich media in response to the request of the terminal, and minimum specifications of a terminal capable of reproducing the media, in advance.

17. The system as claimed in claim 16, wherein the terminal provides the rich media server with information on the type of the terminal, and information on a reproducer for reproducing the rich media when requesting the rich media to the rich media server.

18. The system as claimed in claim 17, wherein the controller compares the type information and the information on the rich-media reproducer, provided from the terminal, with the minimum specifications of media corresponding to the requested rich media, determines if the terminal can reproduce the rich media, and controls the media processing unit to generate the rich media with media which can be reproduced.

19. The system as claimed in claim 13, wherein the controller stores a transmission control table, which includes transmission capacity information for controlling an amount of transmission of the rich media according to each bandwidth of the network, in advance, and controls an amount of transmission of the media based on the transmission control table and bandwidth information of the network.

20. The system as claimed in claim 19, wherein the transmission control table includes transmission selection information for selecting whether or not the media is to be transmitted according to each bandwidth of the network, and the controller controls the rich-media encoding unit to remove at least one piece of media having a low importance rate from among at least one piece of media output from the media processing unit, based on the transmission selection information of the transmission control table and the bandwidth information of the network, and to encode remaining media so as to produce the rich media.

21. The system as claimed in claim 19, wherein the transmission control table includes limit delay time information for a transmission delay time of the rich media transmitted through the network, and the controller controls the rich-media encoding unit to encode and sequentially output at least one piece of media received from the media processing unit in a sequence from a piece of media having a higher importance rate to a piece of media having a lower importance rate when a transmission delay time of the network is equal to or greater than the limit delay time information of the transmission control table.

22. The system as claimed in claim 19, wherein the transmission control table includes transmission bit rate information for controlling a transmission bit rate of the media according to each bandwidth of the network, and the controller controls the media processing unit to control the bit rate of the media based on the transmission control table and the bandwidth information of the network.

23. The system as claimed in claim 22, wherein the controller controls the media processing unit to increase or decrease the bit rate of the media in accordance with the transmission bit rate information corresponding to the bandwidth of the network, based on the transmission control table and the bandwidth information of the network.

24. The system as claimed in claim 19, wherein the controller controls an amount of error correction code for the at least one piece of media according to determined importance rates.

25. The system as claimed in claim 24, wherein when the at least one piece of media corresponds to media of an importance level, the controller increases the amount of error correction code for the at least one piece of media based on a communication bandwidth.

26. The system as claimed in claim 24, wherein when the at least one piece of media does not correspond to media of an importance level, the controller decreases the amount of error correction code for the at least one piece of media based on a communication bandwidth.

27. The system as claimed in claim 24, wherein the controller monitors a transmission rate of at least one piece of media including the error correction code, and again controls the amount of error correction code for the at least one piece of media, based on a transmission bit rate control signal generated as a result of the monitoring.

28. A method for providing media based on importance rates, the method comprising the steps of:
   (a) transmitting a response to a user terminal which requests a rich media service;
   (b) extracting media reproduction information corresponding to the request, extracting at least one piece of media corresponding to a service provided based on media according to the media reproduction information, and encoding the at least one piece of media to produce rich media;
   (c) determining an importance rate of each piece of media constituting the rich media; and
   (d) converting a transmission processing for the at least one piece of media based on a result of the determination for the importance rate, and transmitting the at least one piece of media.

29. The method as claimed in claim 28, wherein, in step (c), the importance rate of the at least one piece of media, based on at least one among whether or not the piece of media is a necessary element for the service provided based on media, a duration time during which the piece of media is reproduced through the user terminal, the number of pieces of related reference media, an importance level index specified at a media production stage, and whether or not a retransmission request for the piece of media is available, and whether or not the user terminal can make a retransmission request when the at least one piece of media has been lost due to a media transmission environment.

30. The method as claimed in claim 28, wherein, in step (d), according to a result of the determination for the importance rate, the amount of error correction code for the at least one piece of media is controlled, or a transmission protocol for the at least one piece of media is established.

* * * * *